(12) United States Patent
Pacolt

(10) Patent No.: US 8,985,692 B2
(45) Date of Patent: Mar. 24, 2015

(54) FOLD UP OR DROP DOWN REAR SEAT INCORPORATING A SEATBACK SUPPORTED REAR FACING LATCH FOR SLIDABLY ENGAGING AN ELONGATED STRIKER

(71) Applicant: BAE Industries, Inc., Warren, MI (US)

(72) Inventor: Stanley D. Pacolt, Clarkston, MI (US)

(73) Assignee: BAE Industries, Inc., Warren, MI (US)

( * ) Notice: Subject to any disclaimer, the term of this patent is extended or adjusted under 35 U.S.C. 154(b) by 140 days.

(21) Appl. No.: 13/829,715

(22) Filed: Mar. 14, 2013

(65) Prior Publication Data

US 2014/0265499 A1    Sep. 18, 2014

(51) Int. Cl.
*B60N 2/20*    (2006.01)

(52) U.S. Cl.
CPC ........................................ *B60N 2/20* (2013.01)
USPC .................................. 297/378.13; 296/65.05

(58) Field of Classification Search
USPC .......... 297/378.12–378.14; 296/65.01, 65.03, 296/65.05
See application file for complete search history.

(56) References Cited

U.S. PATENT DOCUMENTS

| | | | |
|---|---|---|---|
| 4,067,611 A | | 1/1978 | Kurozu et al. |
| 4,428,611 A | | 1/1984 | Widmer |
| 4,721,338 A | * | 1/1988 | Kondo ..................... 297/378.13 |
| 4,904,003 A | | 2/1990 | Yamazaki et al. |
| 5,879,043 A | | 3/1999 | Radue et al. |
| 6,132,000 A | | 10/2000 | Tanaka |
| 6,312,055 B1 | | 11/2001 | Uematsu |
| 6,341,820 B1 | | 1/2002 | Kimura et al. |
| 6,769,741 B2 | | 8/2004 | Denning |
| 6,786,551 B2 | | 9/2004 | Brewer et al. |
| 6,974,173 B2 | | 12/2005 | Yokoyama et al. |
| 7,032,973 B2 | | 4/2006 | Reubeuze |
| 7,137,667 B2 | | 11/2006 | Habedank |
| 7,338,128 B2 | | 3/2008 | Inoue et al. |
| 7,404,605 B2 | | 7/2008 | Inoue et al. |
| 7,410,217 B2 | * | 8/2008 | Inoue et al. .............. 297/378.13 |
| 7,490,908 B2 | | 2/2009 | Wieclawski |
| 7,517,022 B2 | | 4/2009 | Habedank et al. |
| 7,568,764 B2 | * | 8/2009 | Harper et al. ................. 297/331 |
| 7,578,558 B2 | | 8/2009 | Tanaka |
| 2006/0152058 A1 | * | 7/2006 | Pejathaya et al. ........ 297/378.12 |
| 2008/0277976 A1 | | 11/2008 | Austin |
| 2009/0008981 A1 | | 1/2009 | Wieclawski |
| 2009/0033138 A1 | | 2/2009 | Yamada et al. |
| 2011/0187171 A1 | | 8/2011 | Ishii et al. |

\* cited by examiner

*Primary Examiner* — William Gilbert
(74) *Attorney, Agent, or Firm* — Gifford, Krass, Sprinkle, Anderson & Citkowski, P.C.; Douglas J. McEvoy

(57) ABSTRACT

A rear row vehicle seat in which a pair of spaced apart and fixed supports are mounted upon a floor of a vehicle. A seat bottom exhibits a pair of side plates pivotally secured between said fixed supports. A seat back is pivotally mounted at its side ends to axially aligning locations of the side plates, offset from a pivot axis established between the seat bottom and the fixed supports, and such that upward pivoting of the seat bottom causes a combined pivotal and vertically induced displacement of the seatback. A latch is mounted to a rear facing location of the seatback and an elongated striker bar is mounted to a structurally supported and elevated location of the vehicle. The striker bar exhibits a combined arcuate and vertically extending profile for engaging the latch while accommodating vertical sliding of the seatback.

11 Claims, 9 Drawing Sheets

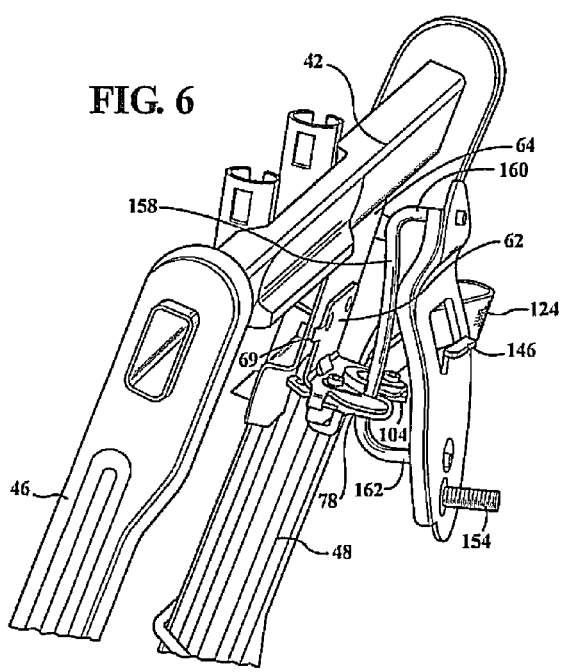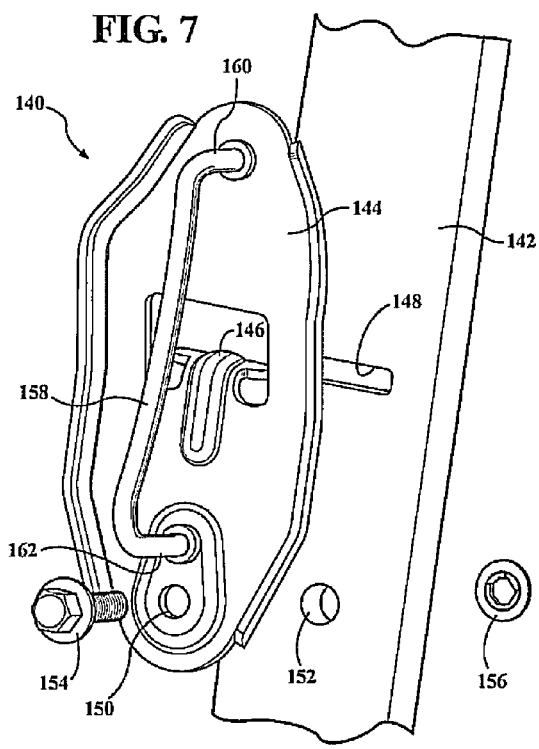

FOLD UP OR DROP DOWN REAR SEAT INCORPORATING A SEATBACK SUPPORTED REAR FACING LATCH FOR SLIDABLY ENGAGING AN ELONGATED STRIKER

FIELD OF THE INVENTION

The present invention relates generally to a rear seat assembly incorporating a dual function fold-up or drop-down seat. More specifically, the invention discloses such a dual function seat in which a high seat back configured latch is designed to slidably displace along an elongate configured striker bar for the purpose of accommodating ease of fold-up of the seat bottom. A strap is provided for separately triggering forward release of the seatback.

BACKGROUND OF THE INVENTION

The prior art is documented with examples of vehicle seat assemblies in which an upright seat back is selectively engaged to a high positioned striker bar. Examples of this are depicted in the seat arrangement of Denning, U.S. Pat. No. 6,769,741, the vehicle seat lock of Inoue et al., U.S. Pat. No. 7,410,217 and Reubeuze, U.S. Pat. No. 7,032,973.

Also noted is the disclosure of Ishii et al., US 2011/0187171 in which a vehicle seat reclining device is configured to be attached to a vehicle body and to cooperate with a locking device affixed to a tiltable backrest of a vehicle seat. A rail is affixed to the vehicle body and extends linearly along a central axial line substantially tangent to an arched path of the locking device corresponding to the tilt of the backrest. A slider is slidably supported upon the rail and in turn mounts a striker bar configured to engage the locking device. A latch mechanism is configured to selectively permit or prevent sliding of the slider along a central axial line relative to the rail.

SUMMARY OF THE INVENTION

The present invention discloses a rear row vehicle seat in which a pair of spaced apart and fixed supports are mounted upon a floor of a vehicle. A seat bottom exhibits a pair of side plates pivotally secured between said fixed supports. A seat back is pivotally mounted at its side ends to axially aligning locations of the side plates, offset from a pivot axis established between the seat bottom and the fixed supports, and such that upward pivoting of the seat bottom causes a combined pivotal and vertically induced displacement of the seatback.

A latch is mounted to a rear facing location of the seatback and an elongated striker bar is mounted to a structurally supported and elevated location of the vehicle. The striker bar exhibits a combined arcuate and vertically extending (inwardly bowed) profile for which retains contact with the latch while accommodating vertical sliding of the seatback during upward folding of the seat bottom.

The latch further includes a modified "L" shaped mounting plate with a first angled side mounted to an intermediate bracket support in turn secured to the seatback, and a second angled side exhibiting an inward profiled recess defined by a plurality of interconnecting sides for receiving the striker bar in an engaged position. A pawl shaped hook is pivotally mounted to a first location of the second angled side, the hook exhibiting configured edge surfaces which selectively overlaps the recess profile of the mounting plate in a capture position of the striker, the pawl further exhibiting an extending ledge.

A cam lever is pivotally mounting to a second location of the second angled side and exhibits a pair of edge surfaces which abut the pawl ledge in a first location. A spring interconnects projecting locations of the hook and cam lever such that, upon pivotal displacement of the cam lever in a direction away from the hook, the hook is caused to rotate out of contact with the recess profile and the seat back to disengage from the striker.

Other features include the cam lever having an angled portion for receiving and retaining a looped end of a pull strap. A retainer plate is affixed to an opposite/upper surface of the second angled side opposite a package mounting side of the hook and cam lever. A self-lubricating bumper is further secured within a depth defining and underside recess associated with the plate and arranged to overlap a striker engagement location along with the overlapping hook.

Additional features include the striker bar having a support plate for mounting to the structurally supported and elevated location of the vehicle. A configured and inwardly angled portion of the support plate seating through a window aperture in the supporting location in alignment with a pair of likewise aligning apertures defined in each of the striker plate and the structurally supporting location, with a bolt fastener extending through the aligning apertures and receiving a retainer nut from an opposite side of the support location.

BRIEF DESCRIPTION OF THE DRAWINGS

Reference will now be made to the attached drawings, when read in combination with the following detailed description, wherein like reference numerals refer to like parts throughout the several views, and in which:

FIG. 6 is a slightly rotated perspective of the seatback frame and depicting the slidably permitted engagement established between the seatback and the elongated striker;

FIG. 7 is an exploded perspective of the elongated striker and the elevated frame mounting location;

DETAILED DESCRIPTION OF THE PREFERRED EMBODIMENTS

The present invention relates generally to a rear seat assembly incorporating a dual function fold-up or drop-down seat. More specifically, the invention discloses such a dual function seat in which a high seat back configured latch is designed to slidably displace along an elongate configured striker bar for the purpose of accommodating ease of fold-up of the seat bottom. A strap is provided for separately triggering forward release of the seatback.

Figure 1:
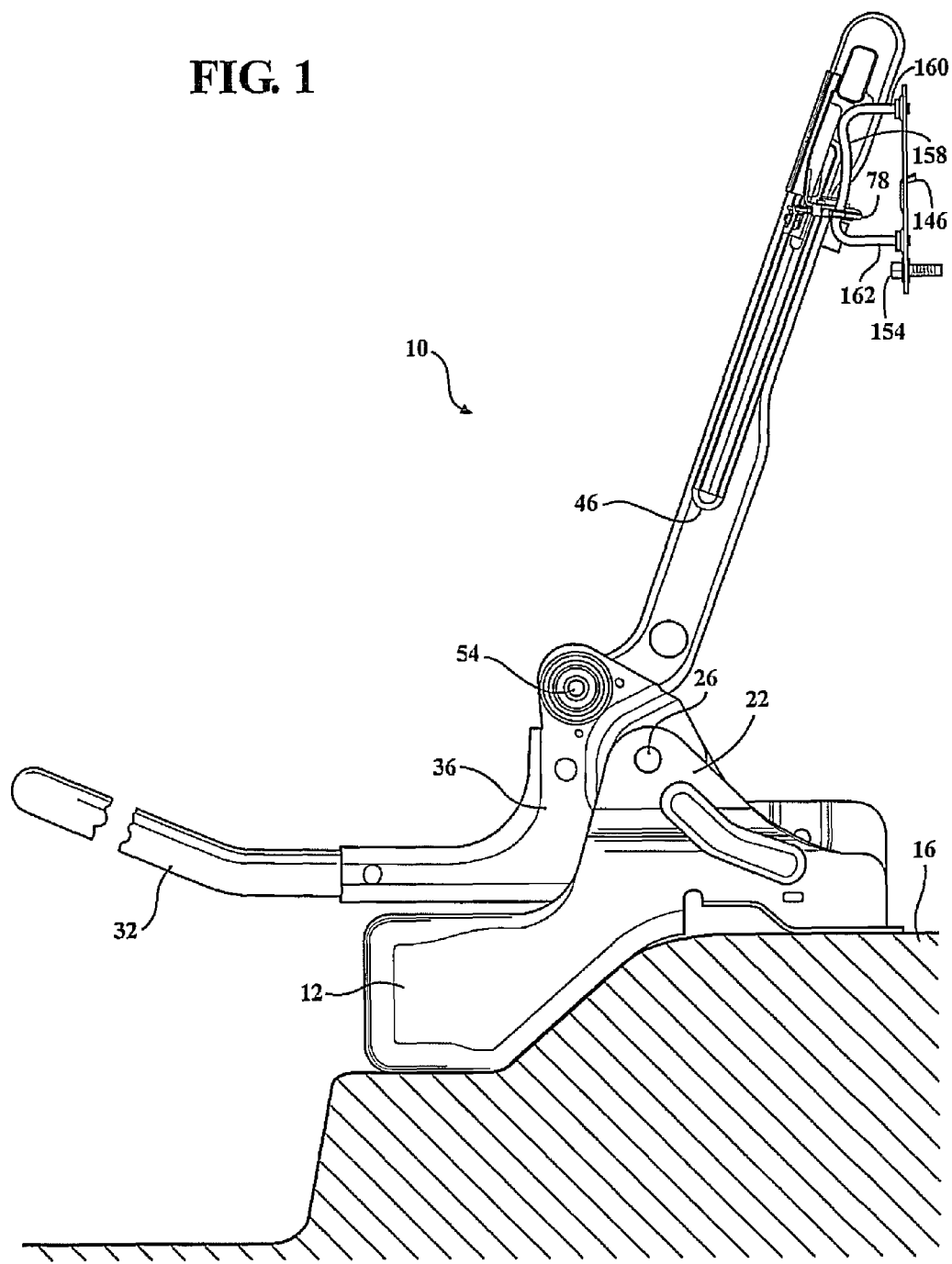
FIG. 1 is an environmental plan view of the seat assembly with rear seatback mounted and striker engaging sliding latch.
Figure 2:
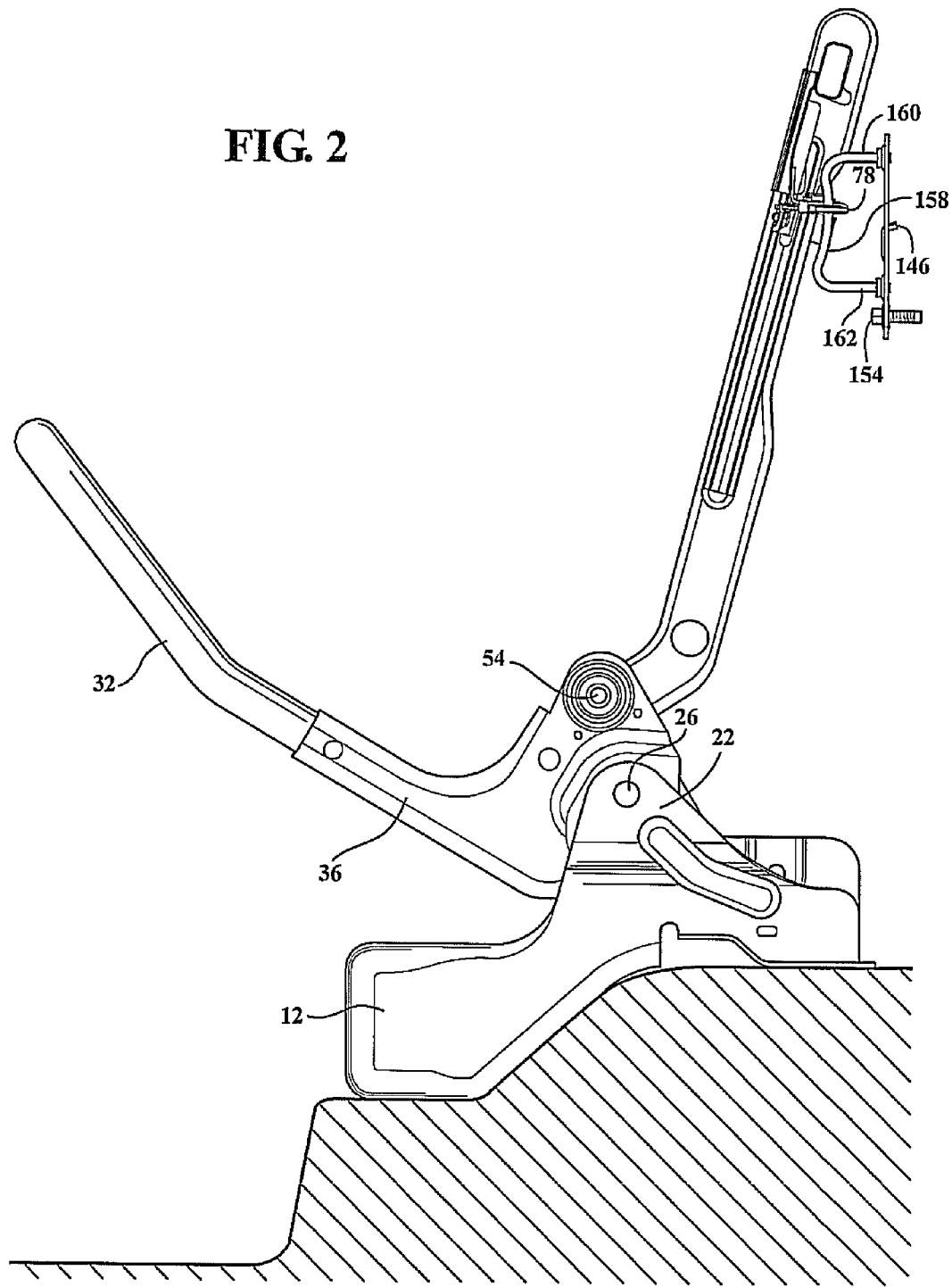
FIG. 2 is a succeeding view to FIG. 1 illustrating the seat bottom in a partially folded up configuration in combination with upward sliding displacement of the seat back along the elongated configured profile of the striker bar.

Referring to each of the environmental plan view of FIG. 1 and the rear orientated perspective of FIG. 2, a seat assembly is generally depicted at 10. A pair of spaced apart and fixed supports are shown at 12 and 14 and which are mounted upon a floor of a vehicle 16 (FIG. 1).

Figure 1A:
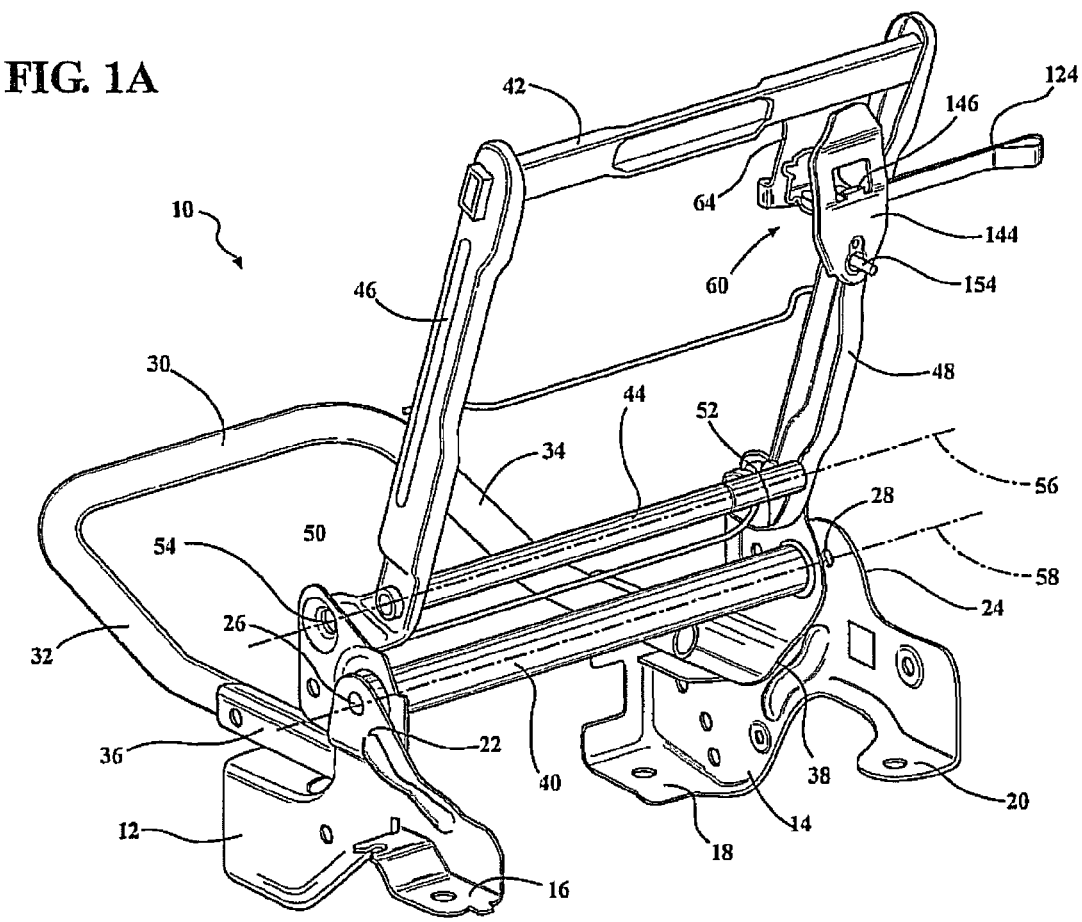
FIG. 1A is a rear oriented perspective view of the seat assembly shown in FIG. 1.

As best shown in FIG. 1A, the fixed supports 12 and 14 exhibit any suitable configuration for mounting to the floor of the vehicle such as being bolted or otherwise secured and as best depicted by mounting location 16 associated with fixed support 12 as well as mounting locations 18 and 20 associated with fixed support 14. The fixed support plates each further exhibit a planar extending portion, at 22 for support 12 and further at 24 for support 14, these in turn each including a coaxially positioned aperture, at 26 for portion 22 and at 28 for portion 24).

A seat bottom is provided and includes a generally U shaped frame, see central portion 30 and interconnected sides 32 and 34. A pair of side plates 36 and 38 are provided and which are configured to mount to extending ends of the sides 32 and 34. The side plates 36 and 38 are in turn pivotally secured between the fixed supports 22 and 24 in a manner which creates a pivot axis between the coaxially positioned mounting apertures 26 and 28. A structurally supporting cross bar 40 is also provided between the side plates 36 and 38.

A seat back includes a generally rectangular shaped frame with a top 42, a bottom 44 and first and second interconnecting sides 46 and 48. As best shown in FIG. 1A, non-linear extending ends 50 and 52 are associated with bottom most locations of the sides 46 and 48, and which are in turn pivotally secured to projecting end locations of the seat bottom side plates 36 and 38 (see selected mounting aperture 54 associated with plate 36 in FIG. 1A). In this fashion, and as again best shown in FIG. 1A, a pivot axis 56 is established between the seat back and seat bottom which is offset from a pivot axis 58 between the seat bottom and fixed supports.

Figure 8:
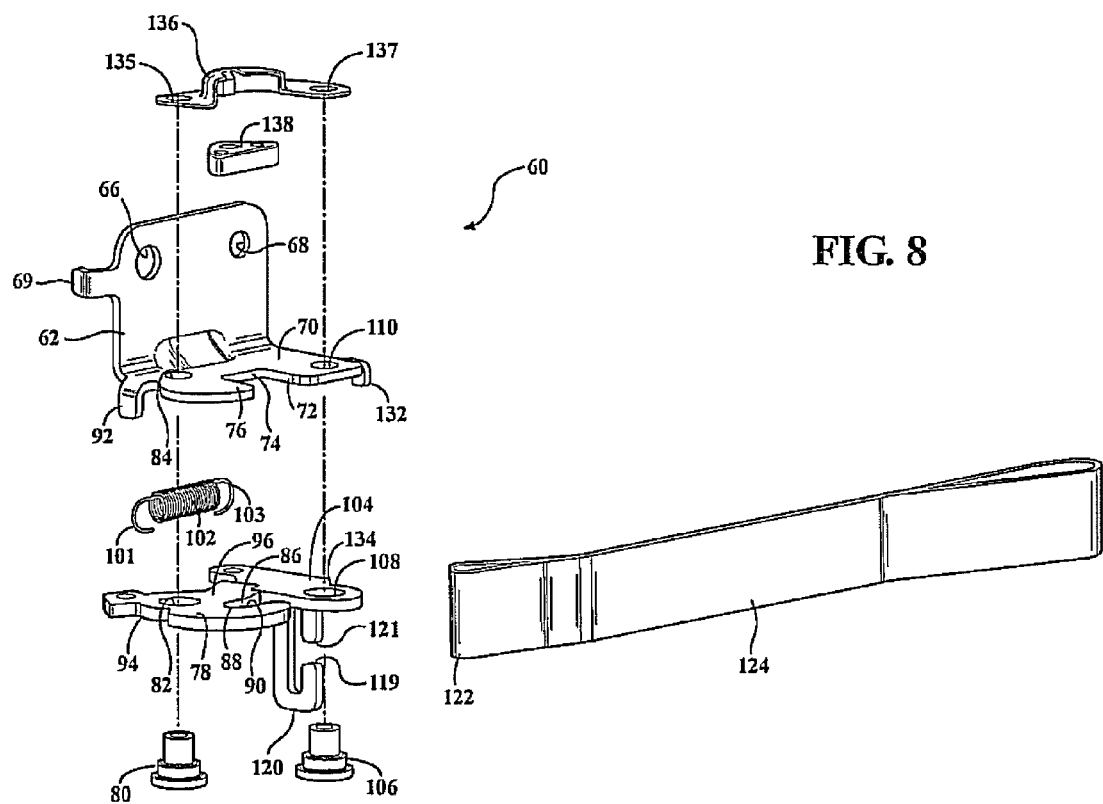
FIG. 8 is an exploded view of the latch assembly integrated into the vehicle seat back.
Figure 9:
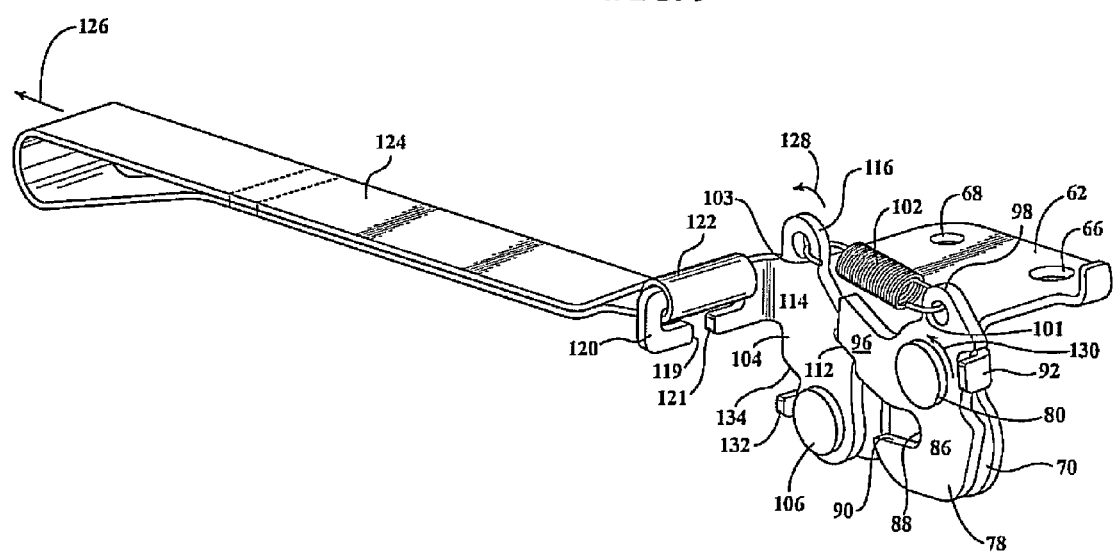
FIG. 9 is an assembled view of the latch assembly in rotated relationship relative to is relative operating position as best shown in FIG. 6 and depicting the manner in which the pull strap engages the spring supporting trigger in order to rotated the engagement pawl to release the striker bar and permit forward dump of the seat back.

A latch subassembly, see as generally depicted at 60 in FIG. 1A as well as in each of FIGS. 8 and 9, is provided and which is mounted to a rear facing elevated location of the seat back, this being best shown in FIG. 1A as proximate an upper corner location between the top 42 and selected interconnecting side 48. A modified "L" shaped mounting plate is provided, with a first angled side 62 mounted to an intermediate bracket support 64 in turn secured to the seatback. To this end, suitable mounting fasteners (e.g. bolts or rivets) are mounted through closed perimeter extending surfaces 66 and 68 defining apertures formed in the angled side 62 and a further integrally configured edge tab 69 is depicted which assists in locating and securing the mounting plate to the elevated seatback location.

A second angled side 70 of the mounting plate exhibits an inward profiled recess defined by interconnecting sides 72, 74 and 76 (again FIG. 8). A pawl shaped hook 78 is provided and is mounted to a first location of the second angled side 70 via a rivet 80 which engages through aligning apertures 82 (in the hook 78) and 84 (in the angled side 70).

As further shown in FIG. 9, configured edge surfaces 86, 88 and 90 within the hook 78 are provided and which selectively overlap the recess profile of the angled side 70 (at 72, 74 and 76) depending upon the rotational positioning of the hook. An angled edge tab 92 formed from the second side 70 is configured to abut a surface location 94 (see FIG. 8) of the hook 78 upon the same being mounted and in the manner depicted in FIG. 9 so as to restrain rotation in a clockwise direction as shown. The hook 78 further includes an extending ledge 96, as well as a further projection 98 with an inner defined aperture 100 through which is engaged a first end 101 of a coil spring 102, the spring further including an opposite and second curled and extending end 103.

A plate shaped cam lever 104 is provided and which is likewise pivotally secured to the second angled side 70 of the mounting plate via a second rivet 106 which mounts through aligning apertures 108 in the cam lever 104 and at 110 in the second angled side 70 of the plate. As best shown in FIG. 9, a pair of interconnecting edge surfaces 112 and 114 of the cam lever 104 define a seating location for the extending ledge 96 of the hook 78.

As best shown in FIG. 9, a further projecting location 116 of the cam lever 104 likewise including an aperture 118 for receiving the second curled end 103 of the spring 102 and is positioned relative to the ledge supporting edge surfaces 112 and 114 and the spaced apart mounting rivet 106 such that the cam lever 104 is maintained into engagement with the hook 78. The cam lever 104 also includes an angled portion 120 which exhibits an interior passageway defining support profile (see spaced apart receiving surfaces 119 and 121) for receiving and retaining a looped end 122 of a pull strap 124.

In this manner, pulling of the strap in the direction indicated by arrow 126 in FIG. 9 results in the cam lever 104 being pivoted in the direction of arrow 128. In turn, the spring 102 is tensioned by the cam plate 104 extending its second curled end 103, at which the pulling force exerted by the first curled end 101 combined with the ledge supporting surfaces 112 and 114 of the cam lever 104 unseating from the ledge 96, causes the hook 78 to rotated in a direction as referenced by arrow 130 and in which the striker receiving profile defined by surfaces 86, 88 and 90 is pivoted out of overlapping alignment with the seating profile 72, 74 and 76 of the angled side 70 of the mounted plate 62.

Also depicted is a further angled end tab 132 associated with an opposite edge of the second angled side 70 and which, as best shown in FIG. 9, abuts an angled edge location at 134 of the cam lever 104 to define a maximum permitted range of rotation about arrow 128. Additional components of the latch subassembly evident in exploded depiction of FIG. 8 include a retainer plate 136 which affixes to an opposite/upper surface of the angled side 70 opposite the package mounting side of the hook 78 and cam lever 104. A self-lubricating bumper 138 is secured within a depth defining and underside recess associated with the plate 136 and is arranged to overlap the profile interior (surfaces 72, 74 and 76) corresponding to the striker engagement location and the alignment of the capture surfaces 86, 88 and 90 of the rotatable hook 78. Viewing FIGS. 6 and 8 in combination, the rivets 80 and 106 extend through additional aligning aperture locations 135 and 137 of the retainer plate 136 for completing the package assembly.

As best depicted in FIG. 7, a striker bar subassembly 140 is depicted which is mounted to an elevated and structurally supported location 142 of the vehicle which opposes the rear facing surface of the seat back. A support plate 144 includes a configured and inwardly angled location 146 (such defining an stamped or otherwise integrally bent portion of the material making up the support plate) which seats through a window aperture 148 in the supporting location 142 in alignment with a pair of likewise aligning apertures at 150 (in the striker plate 144) and at 152 (in the structural support location 142). A hex flange head bolt 154 extends through the aligning apertures 150 and 152, with a push on retainer nut 156 engaging the shaft of the hex head bolt from an opposite side of the support location 142.

Figure 5:
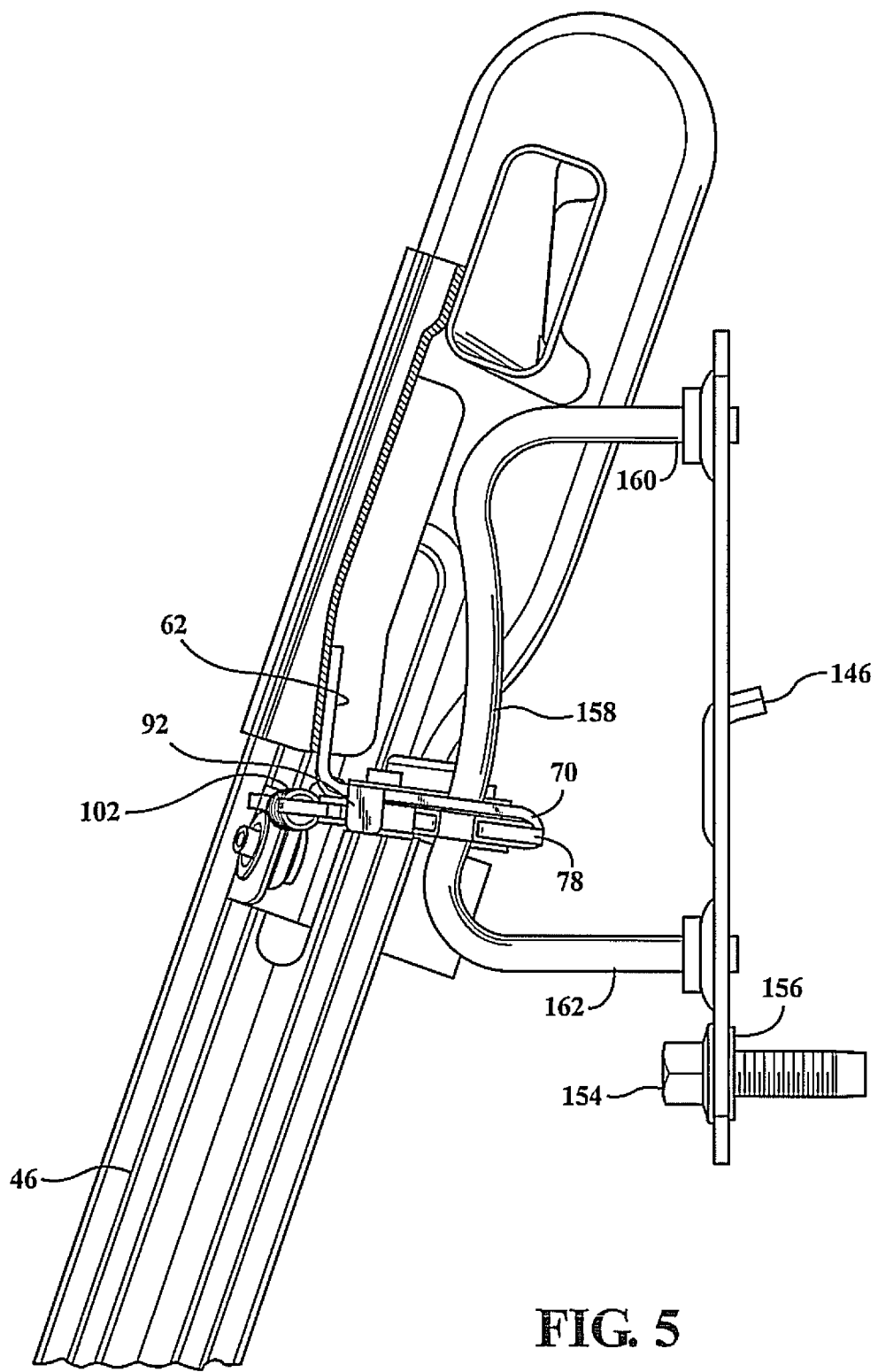
FIG. 5 is an enlarged plan view of the mounting relationship established between the seatback integrated latch and the striker bar.

A striker support surface includes an elongated and wire formed element exhibiting an arcuate or bowed middle portion 158 and which is mounted at upper 160 and lower 162 ends to the support plate 144. As best depicted by reference to FIGS. 5-6, the latch subassembly engages the arcuate middle portion 158 of the striker in such a fashion that a slidable displacing contact is established between the capture location of the latch (defined again as the recess profile defined by surfaces 72, 74, 76 in the angled second side 70 of the mounting plate and over which is aligned the hook engaging surfaces 86, 88 and 90) and the striker 158.

The sliding motion of the latch (again including the hook 78 in rotated engaging and capture position relative to the profile surfaces 72, 74, 76 of the mounting plate) is further successively depicted by comparing the design position of FIG. 1 with the intermediate (FIG. 2) and fully upright (FIG. 3) folded positions of the seat bottom. As previously explained, the folding up motion of the seat bottom as referenced in FIGS. 2-3, influences the seat back in a combined linearly/vertically displacing and incrementally rotating fashion, again owing to the pivotal offset mounting of the seat back to the seat bottom relative to the pivotal mounting relationship established between the seat bottom and the fixed supports.

Figure 3:
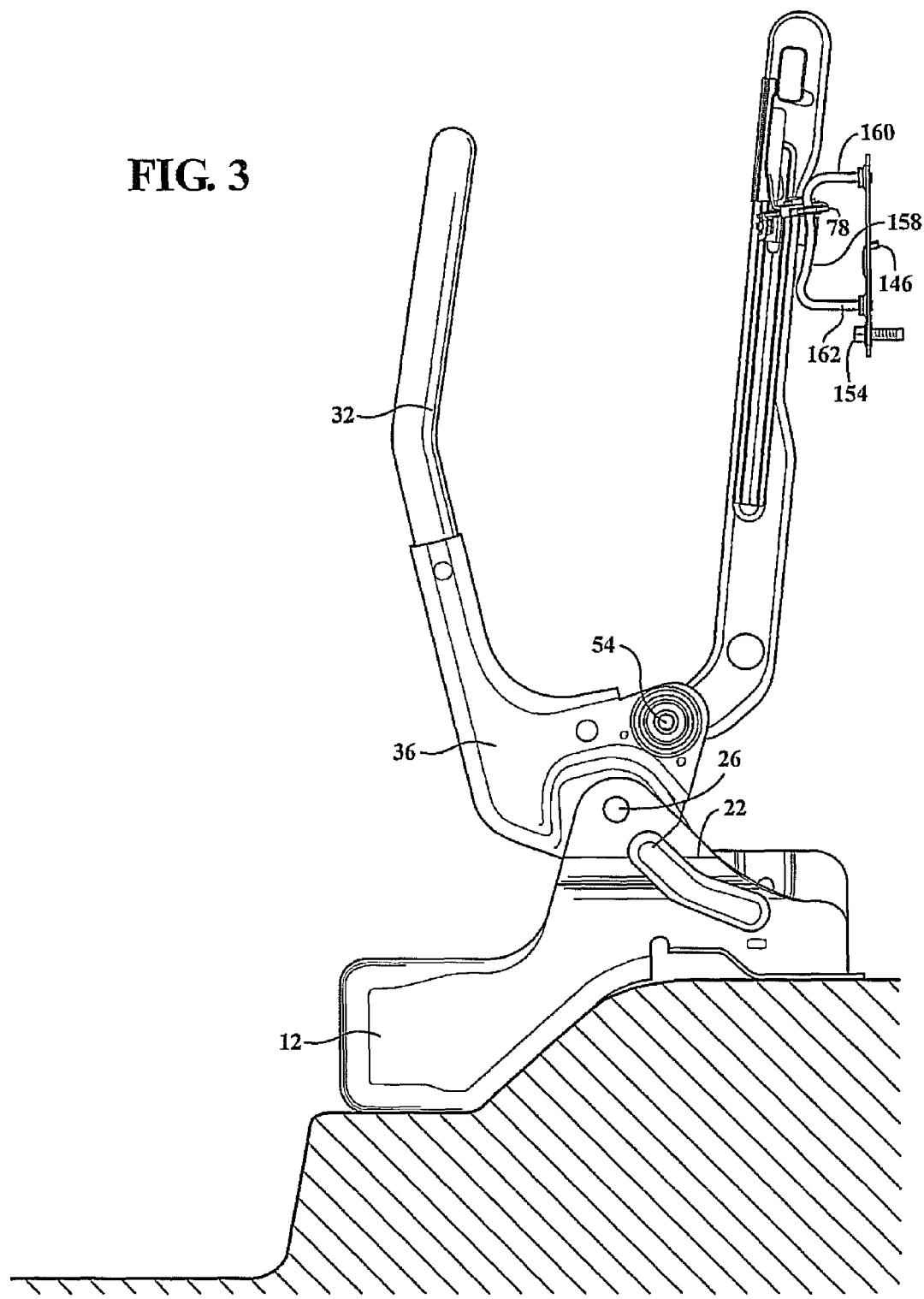
FIG. 3 is a further succeeding folded-up position of the seat bottom and in which the sliding striker is depicted at a generally uppermost position of the elongated vehicle supported striker bar.

The inwardly bowed profiling of the elongated striker element 158 facilitates the displacing motion of the latch between the design position of FIG. 1 in which the latch is located proximate the bottom mounting end 162 and the fold up position of FIG. 3, in which the latch is relocated to a proximate upper most position of the striker proximate its upper mounting end 166. Although not specifically detailed in a comparison between FIGS. 2-3, a slight descending/resetting motion of the latch relative to the upper profile location of the striker 158 accompanies pivoting of the seat bottom over a final few rotational degrees preceding its fully upright folded position.

Figure 4:
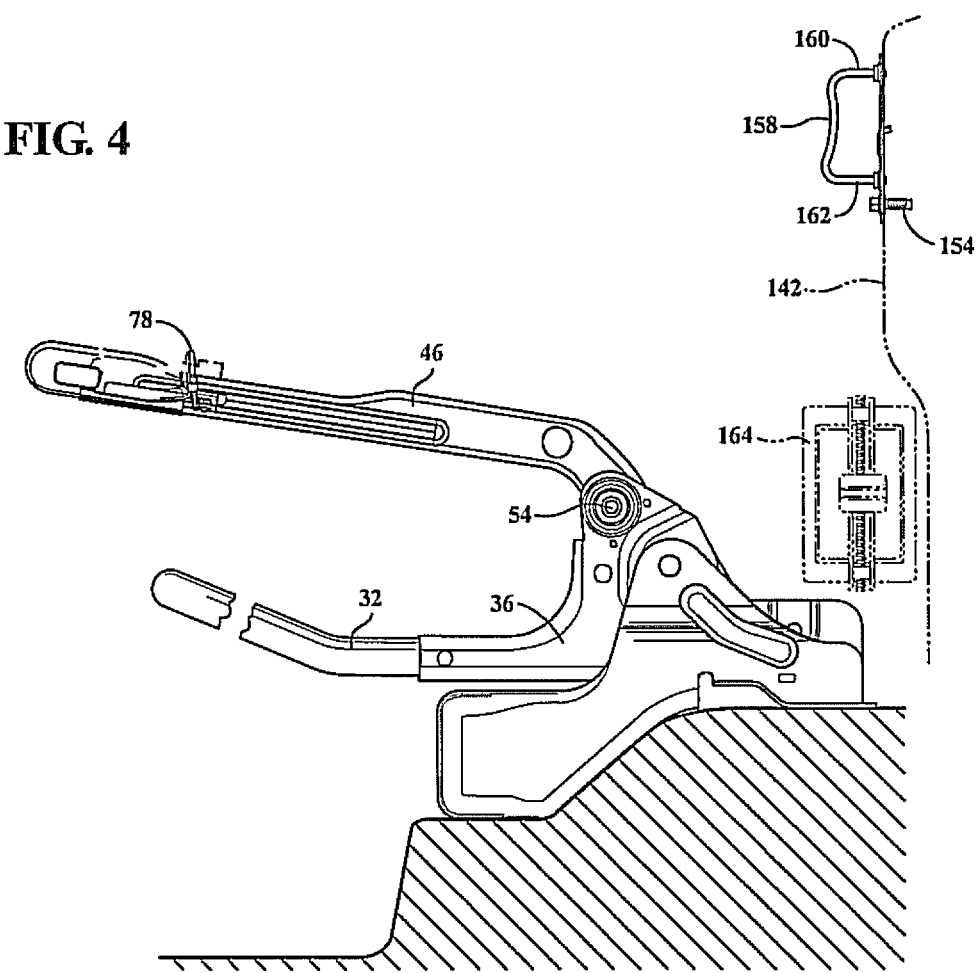
FIG. 4 is a triggered release and forward dump position of the seat back from the striker.

FIG. 4 illustrates a triggered release and forward dump position of the seat back from the striker 158 in the manner taught by the preceding description of FIGS. 8-9 (such as which is initiated by the user pulling on the strap 124 to trigger release of the hook 78) and which can occur simultaneous with the seat bottom having been previously folded up in the position of FIG. 3 or, alternatively, the seat back can be released with the seat bottom retained in its original downward position in FIG. 1. In either instance, the associated vehicle design may include a tire jack (in phantom at 164 in FIG. 4) which is accessible upon forward folding of the seat back.

Return upright rotation of the seatback results in the recess profile defined by surfaces 72, 74 and 76 capturing the striker 158 therein, simultaneous with an edge surface of the hook 78 proximate its ledge 96 being contacted by the striker and caused to reverse rotate back into overlapping engagement. Rotation of the hook 78 occurs simultaneous with spring induced resetting of the cam lever in which the recessed surfaces 112 and 114 of the cam lever again abut the ledge 96 of the hook 78 when returned to the assembly position of FIG. 9.

Having described my invention, other and additional preferred embodiments will become apparent to those skilled in the art to which it pertains, and without deviating from the scope of the appended claims:

I claim:

1. A rear row vehicle seat, comprising:
    a pair of spaced apart and fixed supports mounted upon a floor of a vehicle;
    a seat bottom exhibiting a pair of side plates pivotally secured between said fixed supports;
    a seat back having spaced apart and downwardly extending sides which are pivotally mounted to axially aligning locations of said side plates offset from a pivot axis established between said seat bottom and said fixed supports and such that upward pivoting of said seat bottom causes a combined pivotal and vertically induced displacement of the seatback;
    a latch mounted to a rear facing location of the seatback;
    an elongated striker bar mounted to a structurally supported and elevated location of the vehicle, said striker bar exhibiting a combined arcuate and vertically extending profile for engaging said latch while accommodating vertical sliding of the seatback;
    said latch further having:
    a modified "L" shaped mounting plate with a first angled side mounted to an intermediate bracket support in turn secured to the seatback, a second angled side exhibiting an inward profiled recess defined by a plurality of interconnecting sides for receiving said striker bar in an engaged position;
    a hook pivotally mounted to a first location of said second angled side, said hook exhibiting configured edge surfaces which selectively overlap said recess profile of said mounting plate in a capture position of said striker, said hook further exhibiting an extending ledge;
    a cam lever pivotally mounting to a second location of said second angled side and exhibiting a pair of edge surfaces which abut said ledge in a first location; and
    a spring interconnecting projecting locations of said hook and cam lever such that, upon pivotal displacement of said cam lever in a direction away from said hook, said hook is caused to rotate out of contact with said recess profile and said seat back to disengage from said striker.

2. The seat as described in claim 1, said striker bar further comprising an elongated and inwardly bowed profile between upper and lower connecting ends.

3. The seat as described in claim 1, said cam lever further comprising an angled portion for receiving and retaining a looped end of a pull strap.

4. The seat as described in claim 1, further comprising a retainer plate affixing to an opposite/upper surface of said second angled side opposite a package mounting side of said hook and cam lever, a self-lubricating bumper being secured within a depth defining and underside recess associated with said plate and arranged to overlap a striker engagement location along with said overlapping hook.

5. The seat as described in claim 1, said striker bar further comprising a support plate for mounting to the structurally supported and elevated location of the vehicle, a configured and inwardly angled portion of said support plate seating through a window aperture in the supporting location in alignment with a pair of likewise aligning apertures defined in each of said striker plate and the structurally supporting location, a bolt fastener extends through said aligning apertures and receiving a retainer nut from an opposite side of the support location.

6. A combination fold-up or drop-down rear row vehicle seat, comprising:
- a pair of spaced apart and fixed supports mounted upon a floor of a vehicle;
- a seat bottom exhibiting a pair of side plates pivotally secured between said fixed supports;
- a seat back having spaced apart and downwardly extending sides which are pivotally mounted to axially aligning locations of said side plates offset from a pivot axis established between said seat bottom and said fixed supports and such that upward pivoting of said seat bottom causes a combined pivotal and vertically induced displacement of the seatback;
- a latch mounted to a rear facing location of the seatback and including a hook and cam lever for triggering selective engagement or disengagement of said hook relative to an elongated striker bar mounted to a structurally supported and elevated location of the vehicle, said striker bar exhibiting an elongated and inwardly bowed profile for engaging said latch while accommodating vertical sliding of the seatback;
- said latch further having:
- a modified "L" shaped mounting plate with a first angled side mounted to an intermediate bracket support in turn secured to the seatback, a second angled side exhibiting an inward profiled recess defined by a plurality of interconnecting sides for receiving said striker bar in an engaged position;
- said hook pivotally mounted to a first location of said second angled side and exhibiting configured edge surfaces which selectively overlap said recess profile of said mounting plate in a capture position of said striker, said hook further exhibiting an extending ledge;
- a cam lever pivotally mounting to a second location of said second angled side and exhibiting a pair of edge surfaces which abut said ledge in a first location; and
- a spring interconnecting projecting locations of said hook and cam lever such that, upon pivotal displacement of said cam lever in a direction away from said hook, said hook is caused to rotate out of contact with said recess profile and said seat back to disengage from said striker.

7. The seat as described in claim 6, said cam lever further comprising an angled portion for receiving and retaining a looped end of a pull strap.

8. The seat as described in claim 6, further comprising a retainer plate affixing to an opposite/upper surface of said second angled side opposite a package mounting side of said hook and cam lever, a self-lubricating bumper being secured within a depth defining and underside recess associated with said plate and arranged to overlap a striker engagement location along with said overlapping hook.

9. The seat as described in claim 6, said striker bar further comprising a support plate for mounting to the structurally supported and elevated location of the vehicle, a configured and inwardly angled portion of said support plate seating through a window aperture in the supporting location in alignment with a pair of likewise aligning apertures defined in each of said striker plate and the structurally supporting location, a bolt fastener extends through said aligning apertures and receiving a retainer nut from an opposite side of the support location.

10. A rear row vehicle seat, comprising:
- a pair of spaced apart and fixed supports mounted upon a floor of a vehicle;
- a seat bottom exhibiting a pair of side plates pivotally secured between said fixed supports;
- a seat back having spaced apart and downwardly extending sides which are pivotally mounted to axially aligning locations of said side plates offset from a pivot axis established between said seat bottom and said fixed supports and such that upward pivoting of said seat bottom causes a combined pivotal and vertically induced displacement of the seatback;
- a latch mounted to a rear facing location of the seatback;
- an elongated striker bar mounted to a structurally supported and elevated location of the vehicle, said striker bar exhibiting a combined arcuate and vertically extending profile for engaging said latch while accommodating vertical sliding of the seatback; and
- said striker bar further having a support plate for mounting to the structurally supported and elevated location of the vehicle, a configured and inwardly angled portion of said support plate seating through a window aperture in the supporting location in alignment with a pair of likewise aligning apertures defined in each of said striker plate and the structurally supporting location, a bolt fastener extends through said aligning apertures and receiving a retainer nut from an opposite side of the support location.

11. A combination fold-up or drop-down rear row vehicle seat, comprising:
- a pair of spaced apart and fixed supports mounted upon a floor of a vehicle;
- a seat bottom exhibiting a pair of side plates pivotally secured between said fixed supports;
- a seat back having spaced apart and downwardly extending sides which are pivotally mounted to axially aligning locations of said side plates offset from a pivot axis established between said seat bottom and said fixed supports and such that upward pivoting of said seat bottom causes a combined pivotal and vertically induced displacement of the seatback;
- a latch mounted to a rear facing location of the seatback and including a hook and cam lever for triggering selective engagement or disengagement of said hook relative to an elongated striker bar mounted to a structurally supported and elevated location of the vehicle, said striker bar exhibiting an elongated and inwardly bowed profile for engaging said latch while accommodating vertical sliding of the seatback; and
- said striker bar further having a support plate for mounting to the structurally supported and elevated location of the vehicle, a configured and inwardly angled portion of said support plate seating through a window aperture in the supporting location in alignment with a pair of likewise aligning apertures defined in each of said striker plate and the structurally supporting location, a bolt fastener extends through said aligning apertures and receiving a retainer nut from an opposite side of the support location.

\* \* \* \* \*